United States Patent [19]
Fargier et al.

[11] Patent Number: 4,848,526
[45] Date of Patent: Jul. 18, 1989

[54] MULTIPLE DISC BRAKE

[75] Inventors: Eric Fargier, Neuilly-Plaisance; Jean-Claude Mery, Pavillons-sous-Bois, both of France

[73] Assignee: Bendix France, Drancy, France

[21] Appl. No.: 270,708

[22] Filed: Nov. 14, 1988

Related U.S. Application Data

[62] Division of Ser. No. 111,942, Oct. 21, 1987, Pat. No. 4,798,268.

[30] Foreign Application Priority Data

Oct. 29, 1986 [FR] France .................. 86 15044

[51] Int. Cl.⁴ .............................................. F16D 55/36
[52] U.S. Cl. .................. 188/71.5; 188/18 A; 188/71.1; 192/70.2; 403/359
[58] Field of Search .................. 188/71.5, 73.38, 71.1, 188/73.43, 205 A, 218 A, 18 A; 192/70.16, 70.17, 70.18, 70.19, 70.2, 300; 403/359

[56] References Cited

U.S. PATENT DOCUMENTS

| | | | |
|---|---|---|---|
| 1,270,533 | 6/1918 | Lombard | 403/359 X |
| 2,025,098 | 12/1935 | Dudick | 192/70.2 X |
| 3,630,320 | 12/1971 | Lochmann | 188/18 A |
| 4,556,135 | 12/1985 | Loizeau | 192/70.17 X |
| 4,605,103 | 8/1986 | Carre et al. | 192/70.2 X |
| 4,614,254 | 9/1986 | Mery et al. | 192/70.2 X |

Primary Examiner—George E. A. Halvosa
Attorney, Agent, or Firm—Larry J. Palguta; Ken C. Decker

[57] ABSTRACT

Multiple disc brake comprising a first rotary disc fixed to a hub connected to a rotating member to be braked and at least one second rotary disc capable of sliding axially relative to the hub and to the first disc. A first axial guide sleeve (16) fixed to the first disc (1) is arranged coaxially relative to a second axial guide sleeve (18) fixed to the second disc (2) and is connected to this second sleeve (18) by way of several grooves (22), rolling members (27) being in contact with at least one face of these. The invention is used on multiple disc brakes for land vehicles.

6 Claims, 3 Drawing Sheets

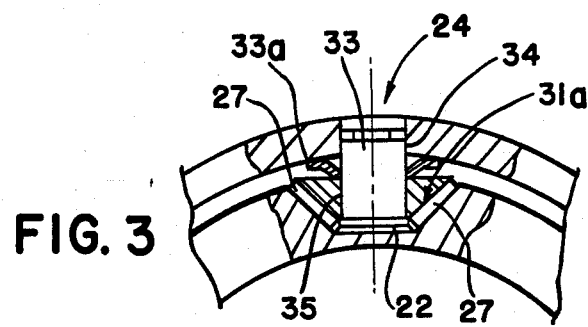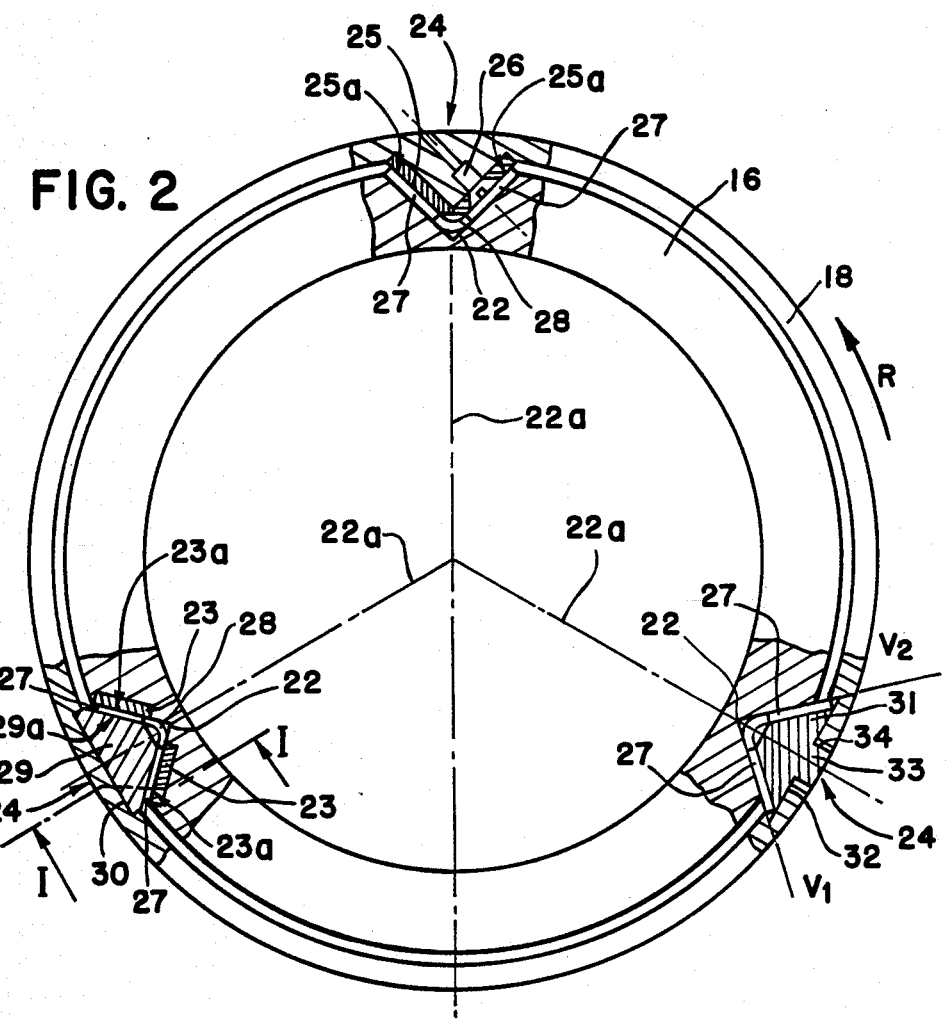

MULTIPLE DISC BRAKE

This a divisional of co-pending application Ser. No. 111,942, filed on Oct. 21, 1987, now U.S. Pat. No. 4,798,268.

The invention relates to a multiple disc brake comprising a first rotary disc fixed to a hub connected to a rotating member to be braked and at least one second rotary disc capable of sliding axially relative to the hub and to the first disc, while at the same time being integral in terms of rotation with the first disc, the axes of the hub and of the discs coinciding with one another, and a set of friction blocks having friction linings capable of being laid against the faces of the discs by means of an actuating device.

The document EP-A-No. 130,883 already makes known a multiple disc brake, in which the second disc is carried by an internally splined sleeve which can slide on part of the externally splined hub, the mutual engagement of these splines ensuring that the second disc is driven in rotation by the hub. To reduce the effects of the play which inevitably exists between the splines of the sleeve and of the hub and which can cause rattling when the flanks of the splines abruptly come in contact with one another, during braking these working to transmit the deceleration torque of the second disc to the hub, it was proposed to provide an arrangement which generates between the sleeve and the hub a torque stressing them about their common axis in such a direction that it tends to bring up against one another the flanks of the splines of the hub and of the sleeve, via which the braking force is transmitted to the hub. The torque-generating arrangement comprises at least one elastic element, for example a rubber block expanded within a receptacle by means of an inner pin.

Such a prestressing of the splines made it possible to prevent rattling between flanks at the moment when the brake was applied and if the braking direction was reversed. On the other hand, during long-term tests, it became clear that either the elastic element gradually lost its elasticity or splines tended to seize because they had remained too long in the same position under vibration, the second rotary disc no longer sliding relative to the first in a truly free manner. After a long operating time, these faults resulted in abnormal wear of some flanks of the discs and some of the friction blocks.

It is therefore an object of the invention specifically to provide a multiple disc brake, the second disc of which has a movability relative to the first disc and to the hub which is both greater and less sensitive to heating and which is maintained to a greater extent over a period of time, since it makes use of rolling principles. Another object of the invention is to obtain this result by relatively simple inexpensive means easy to put into practice for large-series production.

For this purpose, according to the present invention, a first axial guide sleeve fixed to the first disc is arranged coaxially relative to a second axial guide sleeve fixed to the second disc and is connected directly or indirectly to this second sleeve by means of several axial guide tracks distributed angularly over the sleeves, the guide tracks having matching rolling surfaces, between which rolling members are interposed. The rolling members consist of rollers or needles of small diameter, arranged transversely relative to the sliding axis of the second sleeve.

According to another embodiment, the guide tracks are of the groove/projection type, and the faces of each groove which is made in one of the sleeves interact, for transmitting the brake torque to the second disc, with the opposite faces of a matching projecting axial rib made on the other sleeve, to form rolling surfaces arranged in the form of a V, as seen in cross-section. The V-form of the faces of each groove makes it possible to transmit high torques coming from the second disc, while at the same time ensuring, in a compact way, the axial sliding of the second disc on the rolling members and good centering of the second sleeve in relation to the first. The two branches of the V can have different inclinations, the branch of lesser inclination and nearest the radial position being that which makes the torque-transmitting contact during braking in the usual direction, for example forwards for a vehicle.

According to an advantageous embodiment, the V-shaped grooves are made in the outer surface of the inner sleeve, and the V-shaped axial ribs are made on or attached to the inner surface of the outer sleeve. The rolling surfaces of the grooves and/or of the axial ribs are then formed from a material attached to the corresponding sleeve and having high hardness and/or abrasion resistance. Each rib can consist of a tongue or bar fitted in a groove or an axial support formed in the sleeve or of a tongue or bar arranged in a shallow groove or an axial support and held in the axial position by means of cylindrical studs engaged in bores made in the sleeve carrying the tongue. At least one elastic washer can be arranged round the studs of at least one of the tongues or bars and interposed between this tongue and the axial support formed in the sleeve.

According to yet another embodiment, the guide tracks comprise a rolling surface made on one of the sleeves according to an arrangement (as seen in cross-section) tangential to the circular periphery of the sleeve, and a matching rolling surface made on a ring or bush mounted on the other sleeve, and torque-transmitting elements arranged between the two sleeves in order to make the latter integral with one another in terms of rotation pass radially through orifices made in the ring and have dimensions preventing any interference between the torque-transmitting elements and the ring. The torque-transmitting elements consist of radial studs accommodated in a bore made in the outer sleeve and projecting into a corresponding axial groove in the inner sleeve with a functional play.

One of the radial studs projects into one of the axial grooves with an assembly play which is greater than the functional play and within which is inserted a compensating spring which keeps the stud in abutment and which can be compressed a small amount in order to compensate the contact play, for example that arising as a result of expansion or the reversal of the direction of rotation of the member to be braked.

According to the most common embodiment, the first sleeve is fastened laterally to the flange of the first disc and is placed inside the second sleeve which is in one piece with the second disc.

According to a sealed embodiment of the multiple disc brake, the end of the second sleeve is connected to the first disc on the opposite side to the second disc by means of a first flexible and substantially leak-proof annular member, for example a first diaphragm, while the end of the first sleeve inside the second sleeve is connected to the second disc by means of a second flexible and substantially leak-proof annular member, for example a second diaphragm, in order to isolate the interacting faces of the two sleeves from external pollution. The second flexible annular member directed outwards is advantageously protected against shocks by means of a resistant annular casing with a turned-down edge, for example made of sheet metal.

The invention will now be described by way of example with reference to the accompanying drawing in which:

FIG. 2 shows a cross-sectional view along the line II—II of FIG. 1 of only the sleeves of the brake discs equipped with several types of V-shaped connections between the sleeves;

FIG. 3 is a fragmentary cross-sectional view of another type of V-shaped connection between the sleeves;

Figure 1:
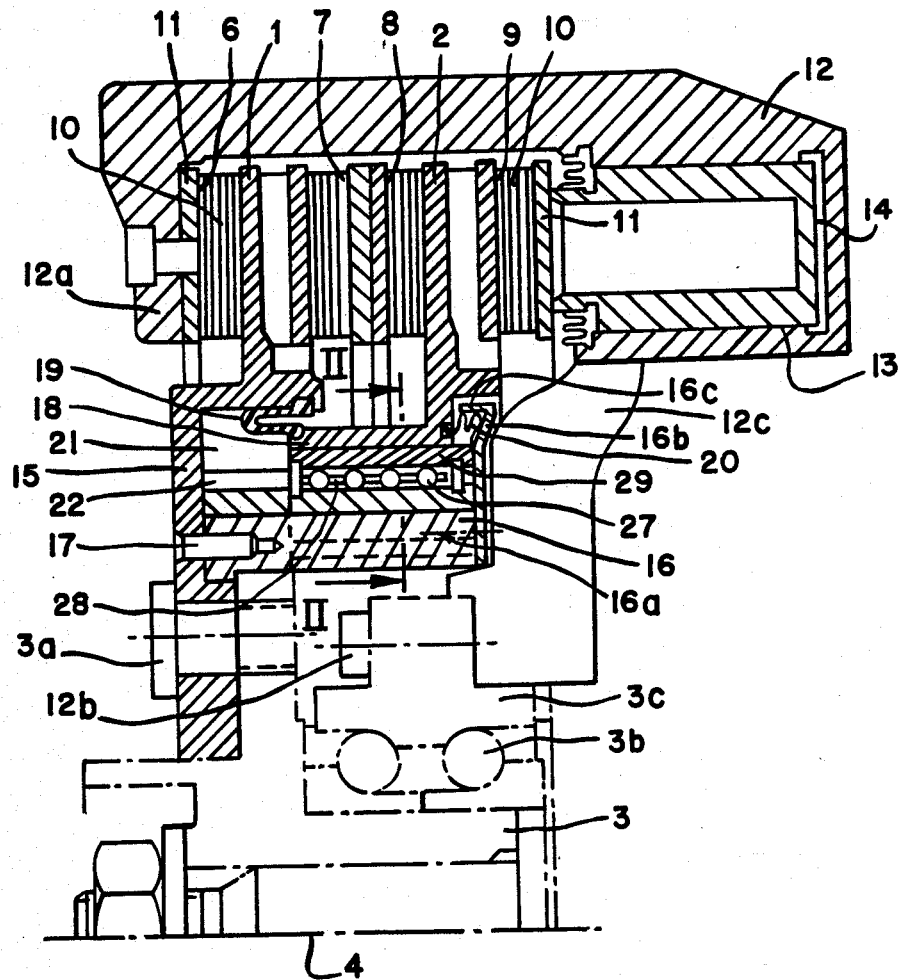
FIG. 1 shows a first embodiment of the multiple disc brake according to the invention in axial section in a plane along the line I—I in FIG. 2.

The multiple disc brake illustrated in FIG. 1 comprises a first rotary disc 1, called an outer disc, and a secondary rotary disc 2, called an inner disc, both fixed to a hub 3, the axis 4 of which coincides with those of the discs 1 and 2. The hub 3, like the other components which are not part of the actual brake, is represented by dot-and-dash lines and rotates on a ball-bearing 3b mounted inside a stationary ring 3c. Whereas the disc 1 is fixed to the hub 3 by means of a ring of screws 3a and is therefore stationary in the direction of the axis 4, the disc 2 can move in this direction by sliding means which will be described later.

Each brake disc 1 or 2 interacts with a pair of friction blocks 6 and 7 or 8 and 9 arranged on either side of the corresponding brake disc 1 or 2 and capable of being laid against the lateral faces of the latter. Each of these friction blocks 6, 7, 8, 9 comprises a friction lining 10 and a lining-holder plate 11, each lining 10 interacting with the adjacent face of the corresponding disc 1 or 2.

A stirrup 12 is fastened to the stationary ring 3c by means of screws 12b via a stirrup holder 12c and is placed over the brake discs 1, 2 and their friction blocks 6, 7, 8, 9, so as to cover the disc/block assembly. In the inner part 13 of the stirrup 12 there is a control motor, such as a hydraulic jack, the piston 14 of which is capable of acting on the lining-holder plate 11 of the inner block 9 and, as a result of reaction and by means of its curved nose 12a, on the lining-holder plate 11 of the outer block 6, so as to control the clamping of the disc/block assembly in the direction of the axis 4 and thus generate the braking friction between each lining 10 and the matching face of the disc.

This action can be accompanied by a movement of the inner disc 2 parallel to the axis 4 in relation to the hub 3. For this purpose, the first disc 1 is connected rigidly towards its center via a flange 15, on the one hand, to the hub 3 by means of the ring of screws 3a and, on the other hand, to a first sleeve 16 by means of a ring of screws 17. The second disc 2 is extended axially and continuously by a second sleeve 18 which is connected substantially sealingly to the foot of the disc 1 by means of a first annular bellows 19 and to the first sleeve 16 by means of a second annular bellows 20 located on the opposite side to the bellows 19, in order to protect the inner coupling space 21 between the first and second sleeves from external pollution, such as dust and gravel, water splashes, etc., while at the same time retaining the grease which fills this inner space. The second bellows 20 is fastened to the first sleeve 16 by means of a ring of screws 16a and is protected against splashes by a rigid annular casing 16b having a turned-down edge 16c and made, for example, of stamped sheet metal.

As can be seen better in FIG. 2, several V-shaped grooves 22 (three in the Figure to ensure good distribution of the forces with a minimum of grooves) are made uniformly on the periphery of the first sleeve 16 arranged concentrically relative to the second sleeve 18 and inside the latter. These grooves 22, obtained by machining at least during finishing, can remain rough or can be provided with a rolling surface 23a in the form of an axial insert 23 attached to each of the faces of the V. To interact with the grooves 22, the second sleeve 18 in one piece with the second disc 2 and surrounding the first sleeve 16 is equipped with projecting axial ribs 24 on the inside. These ribs 24, which must withstand rolling and sliding, are either in one piece with the sleeve 18 (at the top of FIG. 2) and provided with rolling surfaces 25a in the form of tongues 25 attached by means of screws 26, in which case they are produced from a material, such as hardened steel, having high hardness and good abrasion resistance, or attached, as in the other embodiments illustrated in FIGS. 2 and 3. Each groove 22 and the corresponding rib 24 form a guide track for the second sleeve 18, integral with the second disc 2, relative to the first sleeve 16 fastened to the first disc 1 and to the hub 3. Rolling members, which could be balls, but which here consist of rollers or needles 27 of small diameter for reasons of compactness and resistance, are interposed between the matching rolling surfaces of the V-shaped groove 22 and of the rib 24. The needles 27 illustrated in FIGS. 2 and 3 have a small thickness, are arranged transversely relative to the sliding axis of the second sleeve 18 and can be carried in a group by a spacer cage 28 matching as a single unit the V-form of the grooves 22 and of the ribs 24.

According to the various alternative forms illustrated in FIGS. 2 and 3, the axial ribs 24 can consist of an axial tongue or bar 29 fitted in an axial groove 30 made in the second sleeve and having two faces 29a forming a rolling track for the rollers 27. According to the alternative form shown on the right at the bottom of FIG. 2, the tongue or bar 31 is accommodated in a shallow inner groove 32 of the sleeve 18 and is held axially by means of cylindrical studs 33 engaged in corresponding radial bores 34 of the second sleeve 18. According to the alternative form shown in FIG. 3, the tongue 31 having rolling tracks 31a is provided with bores 35, through which pass the studs 33 likewise passing through the bores 34 made in the second sleeve 18. The studs 33 project into the vicinity of the flat bottom of the grooves 22, while at the same time preserving a functional play.

To make it possible to compensate for the play which may exist between the rolling track 31a of the tongue 31 and the needles 27, at least one elastic washer 33a (for example, a Belleville washer) can be inserted round the stud 33 between this tongue 31 and the inner surface of the second sleeve 18.

According to the embodiment illustrated in FIGS. 2 and 3, the two branches $V_1$ and $V_2$ of the V are also inclined relative to the radial mid-plane 22a of each axial groove 22. To improve the operating performance of the sliding means, it is possible to make grooves 22 with a V-shaped cross-section, in which the two branches of the V have different inclinations, the branch $V_1$ (see the bottom of FIG. 2 on the right) which supports the force in the preferred direction of motion R (forwards for a vehicle) having the lesser inclination relative to the radial mid-plane 22a and the other branch $V_2$ having the greater inclination.

The mode of operation of the embodiment illustrated in FIGS. 1 to 3 will now be explained. When the brakes are applied, the piston 14 pushes the plate 11 and the corresponding lining 10 into contact with the first friction track of the second disc 2, and the latter moves axially as a result of the sliding of the second sleeve 18 in relation to the first sleeve 16, with rolling of the needles 27 between the two respective opposite faces of the ribs 24 and of the grooves 22, until the second friction track of the second disc 2 comes in contact with the friction lining 10 of the block 8 which in turn pushes the block 7 into contact with the first friction track of the first disc 1. As a result of reaction, the stirrup 12 then pulls the plate 11 of the last block 6 in the direction of the second friction track of the first disc 1, and the two brake discs 1 and 2 are clamped simultaneously by the four friction linings 10.

If jamming occurred between the opposite surfaces of the grooves 22 and ribs 24, the bearing of the friction linings 10 would be irregular and some would wear quicker than others. Such jamming is prevented over a period of time, because the inner chamber 21 and consequently all the gaps between the needles 27 and their rolling tracks 23a and 25a, 29a, 31a are filled with grease, and the main movement of the needles 27 is a rolling movement under load. The heating of the discs 1 and 2 is transmitted only slightly to the sleeves 16 and 18 which can be partially uncoupled thermally (or isolated) relative to the rolling surfaces of the V-shaped grooves and ribs. Moreover, the grease filling the inner space 21 can have a high resistance to heating (silicone grease). It will be noted that the position of the grooves 22 and of the ribs 24 can be reversed in relation to the sleeves 16 and 18.

Figure 4:
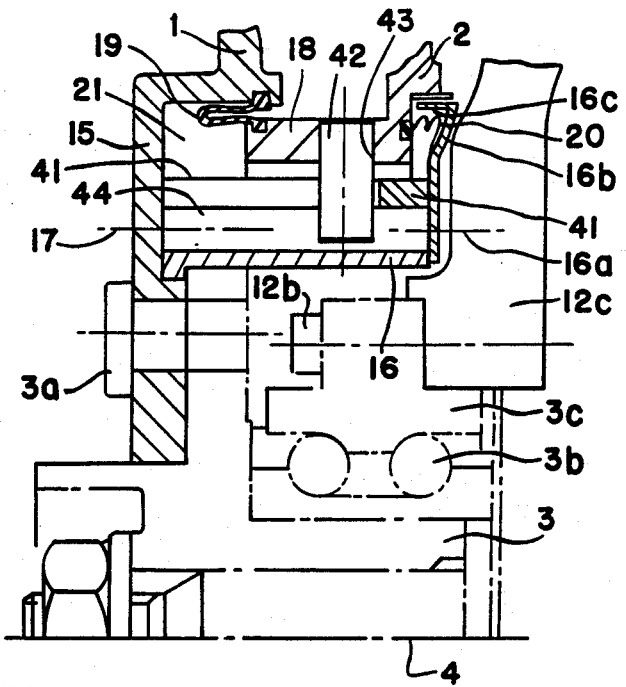
FIG. 4 shows a second embodiment of the multiple disc brake according to the invention on a larger scale and in axial section in a plane along the line IV—IV of FIG. 5, the discs and stirrup being removed.
Figure 5:
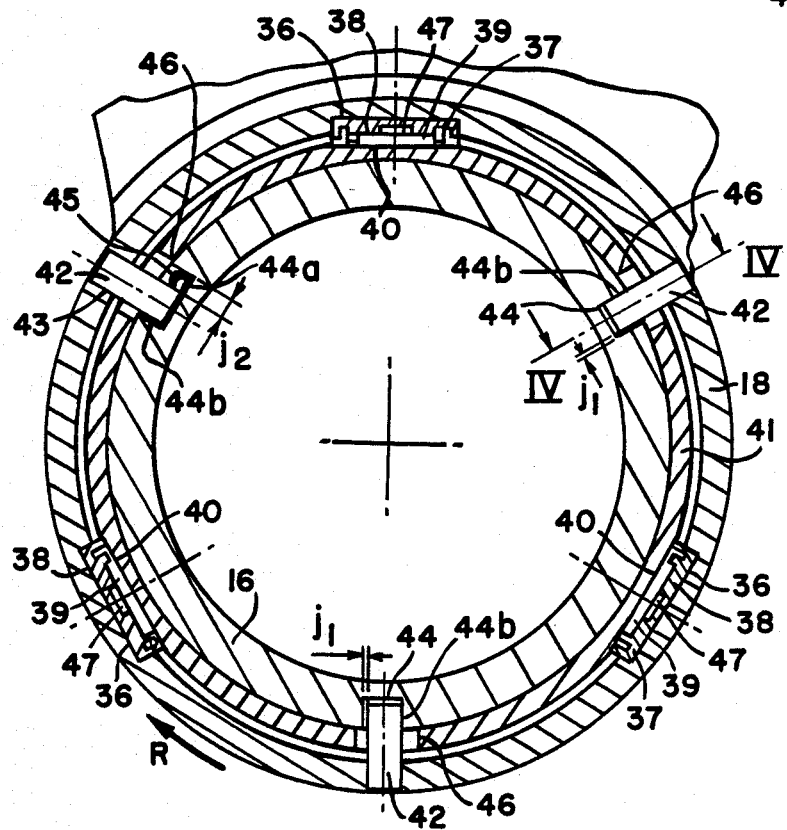
FIG. 5 is a cross-sectional view, corresponding to that of FIG. 4, of only the sleeves of the brake discs.

In FIGS. 4 and 5, the elements also present in the first embodiment bear the same reference. Uniformly distributed axial grooves 36 (of which there are three here) are formed inside the outer sleeve 18 and each cover a longitudinal bar 37 force-fitted and having an axial rolling surface 38 intended for receiving a set of rollers or rolling needles 39. Each axial groove 36 and the corresponding axial rolling surface 38 form a guide track for the second sleeve 18 in relation to the first sleeve 16. The rolling surface 38 is arranged tangentially on the circular periphery of the sleeve, and opposite the needles 39 come in contact with a rolling surface 40 formed on a ring or bush 41 mounted on the inner sleeve 16 fixed to the first disc 1 by means of screws 17 (not shown) of the flange 15. The rolling surface 40 is formed by a simple axial flattened portion machined on the surface of the ring 41 having high hardness and good abrasion resistance, for example made of hardened high-carbon steel. The ring 41 is mounted freely on the inner sleeve 16 and is held in position as a result of the pressure of the needles 39 on the rolling tracks 40.

This arrangement of the axial guide surfaces with transverse cross-section tangential to the circular periphery of the sleeves ensures excellent axial guidance, without thereby transmitting the braking torque of the second disc 2. To perform this last function, there are torque-transmitting elements, such as radial studs 42, of which there are three here, and which are uniformly distributed between the rolling surfaces 40 and are accommodated respectively in a bore 43 of the outer sleeve 18 (second sleeve) and in an axial groove 44 of the inner sleeve 16 (first sleeve). The groove 44 does not open out at the bottom of the sleeve 16, so that the latter can close more firmly and retain the stud 42. Two grooves 44 receive the corresponding stud 42 with a slight functional play $j_1$, while the groove 44a of one of the studs 42 receives the latter with a greater assembly play $j_2$, in order to accommodate a play-compensating leaf spring 45. The studs 42 pass radially through the rolling ring or bush 41 via an axial orifice 46, the width of which is greater than the diameter of these studs which thus never come in contact with this ring 41. This arrangement allows the ring 41 to come in contact with the needles 39, while at the same time being free to rotate, thus making the torque transmission independent of the arrangement of the discs and preventing any torque transmission via the needles, in order to reduce the risks of jamming. To ensure better contact with the lateral flanks of the grooves 44 and 44a, the part of the stud 42 engaged in this groove can have a flattened contact portion or a square or rectangular section in the region of contact with the groove.

When the braked hub 3 rotates in its preferred direction R (forwards for a vehicle) and the brakes are applied, the studs 42 pushed up against the faces 44b of the groove 44 by spring 45 transmit the retaining torque of the brake disc 2 without play to the inner sleeve 16 and to the flange 15 of the first disc 1 fixed to the hub 3. During the wear of the friction linings 10 not shown in FIG. 4, the second disc 2 is progressively pushed to the left in FIG. 4, and the longitudinal bars 37 move relative to the rolling surfaces 40 stationary in the axial direction on the ring 41, causing the needles 39 to roll.

When the braked hub 3 rotates in the opposite direction to its preferred direction R, that is to say during reversing for a vehicle, and the brake is applied, the retaining torque of the disc 2 reverses the tangential forces exerted on the studs 42 which compensate the play $j_1$ by compressing the leaf spring 45 a little, thus reducing the play $j_2$. Contact is then made on two studs 42 only, this being sufficient to transmit the torque because braking seldom takes place in the opposite direction to the preferred direction. The spring 45 prevents any contact rattling between the studs 42 and the lateral faces of the grooves 44.

The inner space 21 delimited by the annular bellows 19 and 20 and containing the guide tracks consisting of the needles 39 and their rolling tracks 38, 40 is filled with grease resistant to heating, as in the first embodiment of FIGS. 1 to 3. It will be seen that the rolling track 38 of the bars 37 has a central groove 47 forming a reserve of grease, since the latter cannot be expelled from this groove 47 as a result of centrifuging caused by the rotation of the outer sleeve 18.

The inner sleeve 16, if lengthened, could receive other outer sleeves 18 carrying other brake discs in addition to the second disc 2, the feet of adjacent discs being connected to one another by means of sealing bellows similar to the bellows 20, and the stirrup 12 covering the discs as a whole.

Of course, the present invention is not limited to the embodiments described and illustrated, but is capable of having many alternative forms accessible to a person skilled in the art, without departing from the spirit of the invention.

We claim:

1. A multiple disc brake, comprising a first rotary disc fixed to a hub connected to a rotating member to be braked and a second rotary disc capable of sliding axially relative to the hub and to the first rotary disc while at the same time being integral in terms of rotation with the first disc, the axes of the hub and discs coinciding with one another, and a set of friction blocks having friction linings capable of being laid against faces of the discs by means of an actuating device, characterized in that a first axial guide sleeve fixed to the first rotary disc is arranged coaxially relative to a second axial guide sleeve fixed to the second rotary disc and is connected to the second axial guide sleeve by means of several axial guide tracks which are uniformly distributed angularly over the sleeves, the guide tracks having matching rolling surfaces between which rolling members are interposed, the guide tracks comprising a rolling surface formed on one of the sleeves according to an arrangement tangential to a circular periphery of the one sleeve, and a matching rolling surface formed on a ring mounted on the other sleeve, and torquetransmitting elements arranged between the sleeves in order to make the sleeves integral with one another in terms of rotation, the torque-transmitting elements passing radially through orifices made in the ring and the orifices having dimensions which prevent any interference between the torque-transmitting elements and the ring.

2. The multiple disc brake according to claim 1, characterized in that the torque-transmitting elements comprise radial studs each of which are accommodated in a bore in the outer sleeve and which project into a corresponding axial groove of the inner sleeve with a functional play.

3. The multiple disc brake according to claim 2, characterized in that one of the radial studs projects into one of the axial grooves with an assembly play which is greater than the functional play and within which is inserted a compensating spring which keeps the studs in abutment and which can be compressed a small amount in order to compensate for contact play.

4. The multiple disc brake according to claim 3, characterized in that the first axial guide sleeve is fastened laterally to a flange of the first rotary disc and is placed inside the second axial guide sleeve which is in one piece with the second rotary disc.

5. The multiple disc brake according to claim 4, characterized in that an end of the second axial guide sleeve is connected, on a side opposite the second rotary disc, to the first rotary disc by means of a first flexible and substantially leak-proof annular member, while an end of the first axial guide sleeve is connected, on a side opposite the first rotary disc, to the second rotary disc by means of a second flexible and substantially leak-proof annular member, so as to isolate interacting faces of the sleeves from external pollution.

6. The multiple disc brake according to claim 5, characterized in that second flexible and substantially leak-proof annular member is protected against shocks by means of a resistant annular casing having a turned-down edge and made of stamped sheet metal.

* * * * *